United States Patent [19]

Huchette et al.

[11] 3,890,300

[45] June 17, 1975

[54] STARCH HYDROLYSATE METHODS FOR ITS PREPARATION AND PRODUCTS BASED THEREON

[75] Inventors: Michel Huchette; Guy Fleche, both of Lestrem, France

[73] Assignee: Roquette Freres, Lestrem, France

[22] Filed: May 11, 1973

[21] Appl. No.: 359,514

[30] Foreign Application Priority Data
May 17, 1972  France .............................. 72.17703

[52] U.S. Cl.. 260/233.3 R; 195/31 R; 260/233.3 A; 424/180; 424/215
[51] Int. Cl............................................ C08b 19/06
[58] Field of Search... 424/180; 260/233.3, 233.3 R, 260/233.3 A

[56] References Cited
UNITED STATES PATENTS

| | | | |
|---|---|---|---|
| 3,399,190 | 8/1968 | Fuzesi et al. ................. | 260/233.3 R |
| 3,414,530 | 12/1968 | Zilkha et al. .................. | 260/233.3 R |
| 3,705,149 | 12/1972 | Babson et al. ................ | 260/233.3 R |

*Primary Examiner*—Melvyn I. Marquis
*Attorney, Agent, or Firm*—Larson, Taylor and Hinds

[57] ABSTRACT

A starch hydrolysate is constituted by chains of propoxylated glucose of which the terminal groups are hydrogenated. It is prepared by subjecting a milk of starch to propoxylation followed by hydrolysis of the starch ether thus obtained and hyrogenation of the resulting syrup, or by subjecting a milk of starch to hydrolysis, subjecting the syrup thus obtained to hydrogenation followed by propoxylation, which step of propoxylation may be effected in the presence of an anion exchange resin. The starch hydrolysates are useful as thickeners for the food industry or for suspending agents for pharmaceutical products.

1 Claim, No Drawings

STARCH HYDROLYSATE METHODS FOR ITS PREPARATION AND PRODUCTS BASED THEREON

The invention relates to a starch hydrolysate.

It relates also to methods for the preparation of this hydrolysate as well as to its applications.

It is a particular object, of the invention, not only to provide a starch hydrolysate which responds to the various desiderata of practice better than hitherto — that is to say whose fermentibility, cariogenic action and hygroscopicity are even weaker and whose inertness with regard to enzymes and acids is almost complete —, but also to provide particularly advantageous methods for the preparation of these hydrolysates.

The starch hydrolysate according to the invention is constituted by chains of propoxylated glucose whose terminal groups are hydrogenated.

To prepare the hydrolysate concerned, a suspension or milk of starch is subjected to one or other of the two following series of successive treatment steps:

propoxylation of milk of starch, hydrolysis of the starch ether thus obtained and hydrogenation of the resulting syrup;

hydrolysis of milk of starch, hydrogenation then propoxylation of the resulting syrup.

The applications of the hydrolysate according to the invention reside particularly in the nutritional field — foods of low nutritional value of the "low calorie" type — and in the pharmaceutical field.

The invention relates, apart from the above-mentioned features, to yet other features which are preferably utilized at the same time and which will be more explicitly considered below and which will, in any case, be well understood by means of the additional description which follows, as well as of the examples, which additional description and examples relate to preferred embodiments, and are not to be regarded as limiting.

It will first of all be recalled that starch is a polymeric compound comprising, in variable proportions according to the origin (corn starch, potato starch, etc...), linear chains of glucose (amylose) and branched chains of glucose (amylopectin).

If one denotes by —OP the propylene oxide radical or propyloxy radical —O—CH$_2$—CHOH—CH$_3$ or

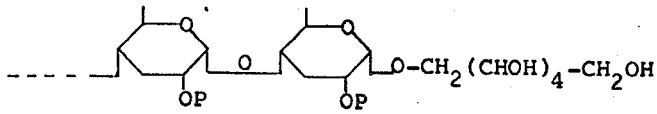

fixed on the links of the polymeric compound, there can be represented by the two following known structural formulae, corresponding respectively to the "amylose" and "amylopectin" components of starch, the propoxylated starch hydrolysate according to the invention whose terminal groups are hydrogenated:

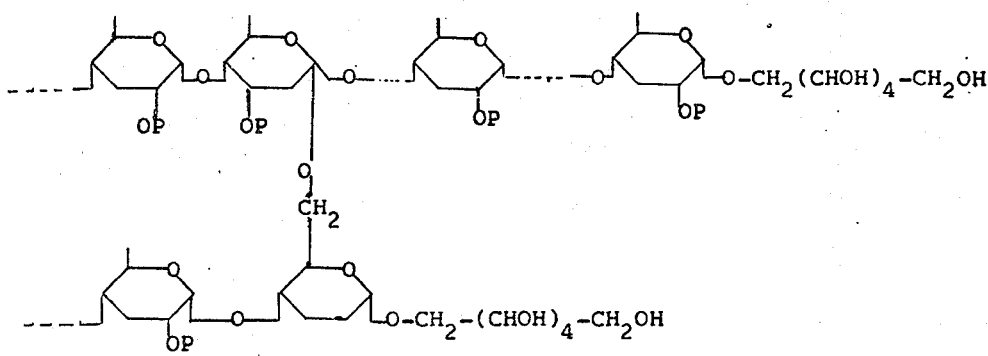

In this hydrolysate, the D.S. or "degree of substitution", that is to say the number of fixed OP groups divided by the number of "substitutable units", is less than 0.6.

The hydrolysate according to the invention practically no longer presents the three serious drawbacks of glucose syrups, namely:

The enzymatic susceptibility, that is to say the possibility of being hydrolysed by the digestive enzymes;

The ease of being degraded into acids and of encouraging the formation of dental caries;

hygroscopicity.

To prepare the abovesaid hydrolysates, a milk of starch can be propoxylated, the starch ether thus obtained hydrolysed, and then the resulting syrup hydrogenated.

The reaction of propylene oxide with starch may be effected either in the dry phase with gaseous propylene oxide, or in aqueous medium in which the starch is held in suspension. It is preferred to work on an aqueous suspension of starch and to cause the propylene oxide introduced to react in the liquid form. Starch is activated by means of an alkaline agent such as soda, lime and the like in a proportion comprised between 0.5 and 3%. It is advantageous to add also a swelling inhibitor to the milk of starch, especially if the alkalinity increases. Generally, sodium sulfate or chloride are satisfactory in amounts comprised between 5 and 50%. The amount of propylene oxide utilized is a function of the degree of substitution desired. In general, amounts comprised between 1 and 40% are used, preferably from 10 to 25% by weight with respect to the weight of dry starch (which quantity is theoretically sufficient to obtain fixing on all the accessible sites). The reaction is conducted at a temperature of 20° to 100°C, preferably from 30° to 50°C. The duration of the reaction is from 2 to 48 hours. The end of the reaction is determined by the measurement of the degree of substitution D.S. [the D.S. can be measured by the method of Morgan described in Anal. Chem. 18, p. 500– 504 (1946)]. The propoxylated milk of starch is then neutralized and washed so as to eliminate all the salts and reactants, which are however not toxic, before pursuing the treatment.

The propoxylated starch is then hydrolysed. There is thus obtained a syrup of which the "dextrose equivalent" is adjusted to the desired value. The hydrolysis can be conducted either by the acid route, or by the enzymatic route by applying known methods, for example that described in French Pat. No. 1,391,911 of Dec. 27, 1963 and that described in French patent application Ser. No. 71.30028 of Aug. 17, 1971. The enzymatic method is preferred since the hydrolysates obtained have a character of greater purity and especially reduced coloration, absence of reversion, etc. It is particularly advantageous to use a method with two enzymatic treatments, namely liquefaction with an $\alpha$-amylase and saccharification with a gluco-amylase.

The "digestibility" or "fermentibility" of the propoxylated syrups thus obtained is connected with the D.S., that is to say to the ratio of propoxylic groups introduced. It is particularly advantageous to take advantage in a simple manner of this property by causing the same amounts of enzymes to act whatever the D.S. In fact, the enzymatic attack ceases by itself, when the steric hindrance due to the propoxylation of the molecules partially degraded by the $\alpha$-amylase no longer enables the protein matrix of the enzyme to act. Hence the propoxylic D.S. is adjusted at the start as a function of the dextrose equivalent or D.E. that it is desired to obtain in the hydrolysate.

In the following Table, there is shown the relationship which exists between the D.S. and the percentage of fixed propylene oxide on one hand, and the dextrose equivalent which illustrates the digestibility on the other hand, the values being given for 100 parts of starch utilized.

TABLE

| D.S. | OP % fixed | D.E. |
| --- | --- | --- |
| 0 | 0 | 111 |
| 0.02 | 0.5 | 106.5 |
| 0.14 | 4.5 | 80 |
| 0.15 | 4.8 | 73 |
| 0.205 | 6.5 | 60 |
| 0.42 | 14 | 25 |
| 0.49 | 16 | 16 |
| 0.58 | 20 | 5 |

The syrups thus obtained may be purified very easily; they are not altered by amylases, the pH of the medium not changing, which is a proof of the fact that they are not nutritive for their dextrin portion and that they possess a minimal cariogenic action.

The subsequent hydrogenation, according to the invention, enables yet further reduction of the susceptibility to fermentation of the sugar residues. Due to this hydrogenation, all the reducing groups which are to be found at the terminal position in the dextrin portions (branched) or in the oligosaccharide portions (linear) are converted into a polyhydric alcohol. Thus glucose chains are obtained, possibly branched, terminated by sorbitol groups.

The hydrogenation takes place in the presence of Raney nickel (3 to 20%), at a temperature comprised between 50° and 150°C, under a pressure of hydrogen of 10 to 150 atmospheres. It is pursued until the level of residual sugar no longer exceeds 0.1%.

It is also possible to hydrogenate a hydrolysed milk of starch first and to propoxylate the hydrogenated syrup. The method of operation is particularly simple in this case. This second method has the advantage of rendering the addition of the swelling inhibitor agent unnecessary, since the reaction medium is a solution. The operations of purification are hence facilitated since there are no considerable amounts of salts. Catalysis is effected under similar conditions to those previously described, in the presence of 0.5 to 3% of alkaline agent. The temperature is comprised between 30° to 80°C and the time between 2 and 48 hours.

It is also possible, in the case of the method which has just been described, to catalyze the propoxylation reaction by means of anionic resins.

Procedure is then as follows: the hydrogenated sugar syrup with a dry material of 20 to 60% and, preferably, of 40% is placed in circulation at the same time as the necessary amount of propylene oxide, on an ion exchange resin of the anionic type. The resin known under the name "Amberlite IRA 900" of the Rohm and Haas company is suitable for this operation. Generally there is used one volume of resin for two volumes of liquid. The temperature is 40°C. The syrup is placed in circulation on a column of resin as long as the reaction is not complete, that is to say as long as the measurement of the rotational power does not indicate a constant value. Generally a time of 24 hours is sufficient.

There is thus obtained a propoxylation yield which is practically quantitative.

The fact that the propoxylated and hydrogenated syrup only contains small amounts of salts arising from the alkali catalyst, as has been mentioned, consequently makes it possible, for the final purification, to simply pass the syrup over cation exchange resins.

In general this purification is followed by a decoloration (for example by means of carbon black or animal black) and passage over a mixed bed of resins (for example, formed of a cationic resin $C_{200}$ and of an anionic resin "IRA 900" of the Rohm and Haas company) to remove the last mineral impurities.

Then, the syrup is concentrated up to the dry material desired or it is sprayed to form a powder therefrom.

The starting D.E. of the syrup can vary in the range 5 to 100, as is evident from the above Table.

The starting material can be constituted by corn starch, potato starch, "waxy-corn" starch, tapioca starch and the like.

The fact of being able to select thus from among a large number of starting materials and of being able to arrange that the D.E. of the final product has a predetermined value, enables a very varied range of products to be made available.

Thus, a starch of the waxy-corn type which has been hydrolysed to a D.E. of 5 before being hydrogenated and propoxylated, provides a thickening product whose nutritional value is nil and which can be used as a thickener for the preparation of a food product.

By reason of their nil fermentibility, of their nil cariogenic effect, of their minimum hygroscopicity, of their practically nil nutritional power and of their complete inertness with respect to acids and enzymes, the hydrolysates according to the invention find numerous applications in the field of thickeners, confectionery, chocolate making and manufacture of foods of the "low calorie" type. The manufacture of products of given viscosity and of given degree of digestibility can also be contemplated.

The binding power of the said hydrolysates makes them of potential usefulness in the pharmaceutical field, for example as suspending agents, especially in dermatological lotions or as blood plasma substitutes.

To fix ideas, there are given below some numerical examples illustrating the preparation of hydrolysates according to the invention.

EXAMPLE 1

In a reactor of 100 l capacity provided with a stirrer, 30 kg of corn starch (of 13% humidity, namely 26.1 kg of dry material) is dispersed in 39.6 l of water, which provides a milk of 21°Be. 3.5 kg of sodium sulfate is added as swelling inhibitor. The temperature is brought to 40°C. There is then added 1 kg of 45% technical soda in the form of a 3% solution. Then, there is slowly added 3 kg of propylene oxide.

The reaction mixture is stirred for 28 hours. It is then neutralized to pH 5.5 with a hydrochloric acid solution and filtered. The product is washed twice to eliminate the salts present. The starch thus obtained contains 9% of propoxylic groups.

The propoxylated starch cake is resuspended in a sufficient amount of water to have a dry material content of about 40. The pH is adjusted to 6.7 with calcium carbonate and 300 g of α-amylase is added, for example the liquefying enzyme of the BL 12.5 type of the RAPIDASE company. The temperature is brought to 85°C for 1 hour. The D.E. rises to 30 at the end of the operation. The pH is then brought to 5.8 and the temperature to 58°C. 0.3% of amylogluocosidase of the "Sumyzyme" type is added. The mixture is stirred for 48 hours.

After neutralization, the hydrolysate is purified by decoloration and passage over a mixed bed of cationic and anionic resins before being subjected to hydrogenation; the latter is effected by means of 5% Raney nickel, at a temperature of 130°C in an autoclave, the hydrogenation pressure being 50 bars. The syrup is then again purified and can be concentrated to a dry material content of 80%; it can also be sprayed.

EXAMPLE 2

In a tank provided with a stirrer and a temperature regulating device, 10 kg of a hydrogenated maltodextrine syrup whose D.E. before hydrogenation was 37, is stirred. The solution used is adjusted to 40% of dry material with water, and it is brought to 40°C. Then, there is slowly added a solution of 304 g of technical soda. This addition is followed by the introduction of 800 g of propylene oxide. It is left for 24 hours with stirring.

The solution obtained is then passed through a cationic column to remove the sodium, then it is percolated through a column filled with carbon black in order to decolorize it. The resulting purified syrup is concentrated up to 75% of dry material in a vacuum evaporator.

The syrup can also be sprayed to form a powder.

The ratio of propoxyl groups is 9.85%, which shows an excellent yield.

EXAMPLE 3

Procedure is identical with that of Example 2, with the slight difference that the hydrogenated syrup to which has been added the propylene oxide is cycled by means of a pump over a column containing anionic resins. The catalysis is hence effected outside of the reaction tank. The degree of progress of the reaction is followed by measuring, for example, the development of the rotational power of the solution. After reaction, the colorless and salt-free syrup is passed over a mixed resin type bed and evaporated. The yield from propoxylation is practically quantitative.

This being the case, and whatever the embodiment adopted, there are thus provided starch hydrolysates and methods for the preparation of these hydrolysates whose features emerge sufficiently from the foregoing for it to be unnecessary to dwell further on the subject.

Said hydrolysates have with respect to those previously existing, numerous advantages, for example:

that of not being degraded by enzymes, the low nutritional value of such products enabling their use in the production of foods of the low calorie type;

that of not being degraded in acids and hence of having an anticariogenic power.

As is self-evident and as emerges already from the foregoing, the invention is in no way limited to those of its types of application and embodiments which have been more especially envisaged; it encompasses, on the contrary, all modifications.

We claim:

1. Starch hydrolysate, the constituent linear and branched glucose chains of which are substituted by the propylene oxide radical —OP and the terminal groups of which are hydrogenated as represented on the corresponding structural formula:

amylose:

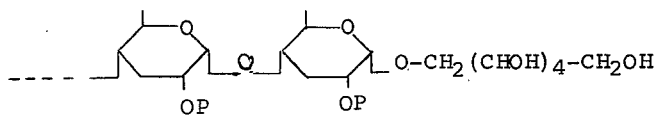

amylopectin:
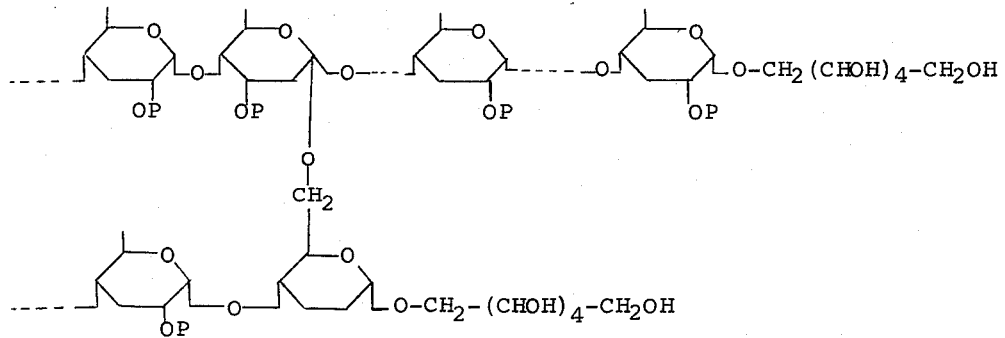
said propylene oxide radical —OP representing a group selected from
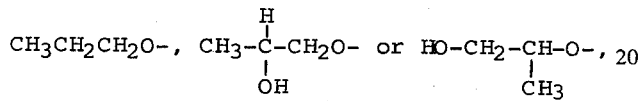
the degree of substitution of said starch hydrolysate being less than 0.6.
* * * * *